(12) United States Patent
Honda et al.

(10) Patent No.: US 9,586,475 B2
(45) Date of Patent: Mar. 7, 2017

(54) FUEL TANK CONNECTOR

(75) Inventors: Itsuo Honda, Kamakura (JP); Shunpei Nabeya, Sagamihara (JP)

(73) Assignee: NIFCO INC., Yokohama-Shi, Kanagawa (JP)

(*) Notice: Subject to any disclaimer, the term of this patent is extended or adjusted under 35 U.S.C. 154(b) by 0 days.

(21) Appl. No.: 14/343,233

(22) PCT Filed: Sep. 7, 2012

(86) PCT No.: PCT/JP2012/072969
§ 371 (c)(1),
(2), (4) Date: Mar. 21, 2014

(87) PCT Pub. No.: WO2013/039013
PCT Pub. Date: Mar. 21, 2013

(65) Prior Publication Data
US 2014/0224819 A1    Aug. 14, 2014

(30) Foreign Application Priority Data

Sep. 12, 2011 (JP) .................................. 2011-197912

(51) Int. Cl.
*F16K 24/04* (2006.01)
*B60K 15/035* (2006.01)
(Continued)

(52) U.S. Cl.
CPC ...... *B60K 15/03504* (2013.01); *B60K 15/035* (2013.01); *F02M 25/0872* (2013.01);
(Continued)

(58) Field of Classification Search
CPC ......... Y10T 137/0777; Y10T 137/0826; Y10T 137/0874; Y10T 137/3099;
(Continued)

(56) References Cited

U.S. PATENT DOCUMENTS 2,185,098 A * 12/1939 Woodbridge ........... F16K 17/36
137/454.2
2,402,342 A * 6/1946 Phillips ............... F16B 23/0023
411/404

(Continued)

FOREIGN PATENT DOCUMENTS

| CN | 101014480 A | 8/2007 |
| CN | 101463779 A | 6/2009 |

(Continued)

OTHER PUBLICATIONS

PCT, International Search Report for PCT/JP2012/072969.
(Continued)

*Primary Examiner* — Craig J Price
(74) *Attorney, Agent, or Firm* — Manabu Kanesaka

(57) ABSTRACT

A fuel tank connector includes an upper chamber provided with a first communication portion relative to a ventilation flow path; and a lower chamber provided with a third communication portion relative to the upper chamber. A bowl-shaped portion narrowing downward is formed in a bottom portion of the upper chamber, and the third communication portion is formed in a bottom of the bowl-shaped portion. A cover body having a container shape, including a top portion and a side portion and opening at a lower face is supported directly above the third communication portion with a ventilation interval between the open edge and the third communication portion.

3 Claims, 5 Drawing Sheets

(51) Int. Cl.
*F02M 25/08* (2006.01)
*B60K 15/03* (2006.01)

(52) U.S. Cl.
CPC ............... *B60K 2015/03256* (2013.01); *B60K 2015/03509* (2013.01); *B60K 2015/03528* (2013.01); *B60K 2015/03542* (2013.01)

(58) Field of Classification Search
CPC  Y10T 137/7358; B60K 15/077; B60K 15/01; B60K 15/035; B60K 15/03504; B60K 2015/03289; B60K 2015/03388; B60K 2015/03523; B60K 2015/03528; B60K 2015/03542; F16K 24/04; F16K 24/00; F16K 17/04; F16K 24/042; F16K 24/044; F16K 24/046; F02M 37/04; F02M 37/00; F02M 25/08; F02M 2015/03289; F02M 25/03388; F02M 25/0872; F02M 2015/03256; F02M 25/03509
USPC ..... 137/39, 41, 43, 202, 409; 220/746, 86.2, 220/203.2, 216, 227; 251/127; 138/39, 138/40, 42
See application file for complete search history.

(56) References Cited

U.S. PATENT DOCUMENTS

| | | | | |
|---|---|---|---|---|
| 3,388,714 | A * | 6/1968 | Rau ................. | 137/202 |
| 4,185,664 | A * | 1/1980 | Zabsky ............ | F15C 1/02 138/40 |
| 4,512,499 | A * | 4/1985 | Uuskallio ........... | 220/374 |
| 4,706,708 | A * | 11/1987 | Fornuto et al. .......... | 137/588 |
| 4,869,821 | A * | 9/1989 | Korin .................. | B01D 63/084 210/321.64 |
| 5,156,178 | A * | 10/1992 | Harris ................. | 137/43 |
| 5,261,439 | A * | 11/1993 | Harris ................. | 137/43 |
| 5,413,137 | A * | 5/1995 | Gimby ............. | B60K 15/03519 137/197 |
| 5,449,018 | A * | 9/1995 | Harris ................. | 137/43 |
| 5,582,198 | A * | 12/1996 | Nagino et al. ............ | 137/43 |
| 5,687,778 | A * | 11/1997 | Harris ................. | 137/43 |
| 5,722,468 | A | 3/1998 | Kido | |
| 6,708,713 | B1 | 3/2004 | Gericke | |
| 6,913,295 | B2 * | 7/2005 | Kimisawa et al. ............ | 137/202 |
| 7,207,347 | B2 | 4/2007 | Olshanetsky et al. | |
| 7,819,129 | B2 * | 10/2010 | Keefer ................ | 137/202 |
| 8,171,952 | B2 | 5/2012 | Martin et al. | |
| 8,720,472 | B2 * | 5/2014 | Kito et al. ............... | 137/202 |
| 2004/0003844 | A1 * | 1/2004 | Yamada ............ | B60K 15/03519 137/202 |
| 2004/0011401 | A1 * | 1/2004 | Kato ................. | 137/202 |
| 2004/0211465 | A1 * | 10/2004 | Miyoshi et al. ............ | 137/202 |
| 2006/0213553 | A1 * | 9/2006 | Mills et al. ............ | 137/43 |
| 2013/0025700 | A1 * | 1/2013 | Kito et al. ............... | 137/202 |

FOREIGN PATENT DOCUMENTS

| | | |
|---|---|---|
| CN | 201661388 U | 12/2010 |
| JP | H08-105571 A | 4/1996 |
| JP | 2000-345933 A | 12/2000 |
| JP | 3953916 B2 | 8/2007 |
| JP | 2010-105523 A | 5/2010 |
| JP | 2010-143498 A | 7/2010 |
| JP | 2011-088516 A | 5/2011 |

OTHER PUBLICATIONS

Europe Patent Office, "Search Report for EP 12832130.4," Jul. 10, 2015.
China Patent Office, "Office Action for CN 201280043307.9," Dec. 29, 2015.

* cited by examiner

FUEL TANK CONNECTOR

FIELD OF TECHNOLOGY

The present invention relates to an improvement of a connector attached to a fuel tank of an automobile, a two-wheel vehicle, or the like, and used for connecting a ventilation flow path of the fuel tank to the fuel tank.

BACKGROUND ART

In a device forming a so-called evaporation, there is a device forming a cylindrical liquid-receiving portion on an evaporation opening for allowing a lower space, into which a fuel enters, and an upper space, which is communicated with the ventilation flow path, to be communicated so as to prevent a fuel in a liquid state from leaking to the ventilation flow path. (See Patent Document 1) However, in such a device, because of a structure itself, although a fuel in a splash form injected into the upper space in the liquid-receiving portion can be received, it is difficult to prevent a fuel in a mist form which is lighter than the fuel in a splash form from leaking to the ventilation flow path.

PRIOR ART DOCUMENT

Patent Document

Patent Document 1: Japanese Patent No. 3953916

SUMMARY OF THE INVENTION

Problems to be Solved by the Invention

A main object of the present invention resides in that in this kind of connector, a fuel inflow into the ventilation flow path can be prevented more effectively.

Means for Solving the Problems

In order to attain the aforementioned object, in the present invention, from the first standpoint, a fuel tank connector attached to a fuel tank for connecting a ventilation flow path thereof to the fuel tank comprises an upper chamber including a first communication portion relative to the ventilation flow path; and a lower chamber including a second communication portion relative to the fuel tank and a third communication portion relative to the upper chamber. In a bottom portion of the upper chamber, there is formed a bowl-shaped portion narrowing downward, and in a bottom of the bowl-shaped portion, there is formed the third communication portion. A cover body having a container shape, including a top portion and a side portion and opening at a lower face is supported directly above the third communication portion with a ventilation interval between an open edge thereof and the third communication portion.

Also, in order to attain the aforementioned object, in the present invention, from a second standpoint, the fuel Lank connector attached to the fuel tank for connecting the ventilation flow path thereof to the fuel tank comprises the upper chamber including the first communication portion relative to the ventilation flow path; and the lower chamber including the second communication portion relative to the fuel tank and the third communication portion relative to the upper chamber. In the bottom portion of the upper chamber, there is formed the third communication portion. Also, the cover body having the container shape, including the top portion and the side portion and opening at the lower face is supported directly above the third communication portion with the ventilation interval between the open edge and the third communication portion by a leg body ranged between the open edge thereof and the third communication portion.

Effect of the Invention

According to the invention, the cover body can electively prevent a fuel injected to the upper chamber from inflowing into the ventilation flow path.

BEST MODES OF CARRYING OUT THE INVENTION

Figure 1:
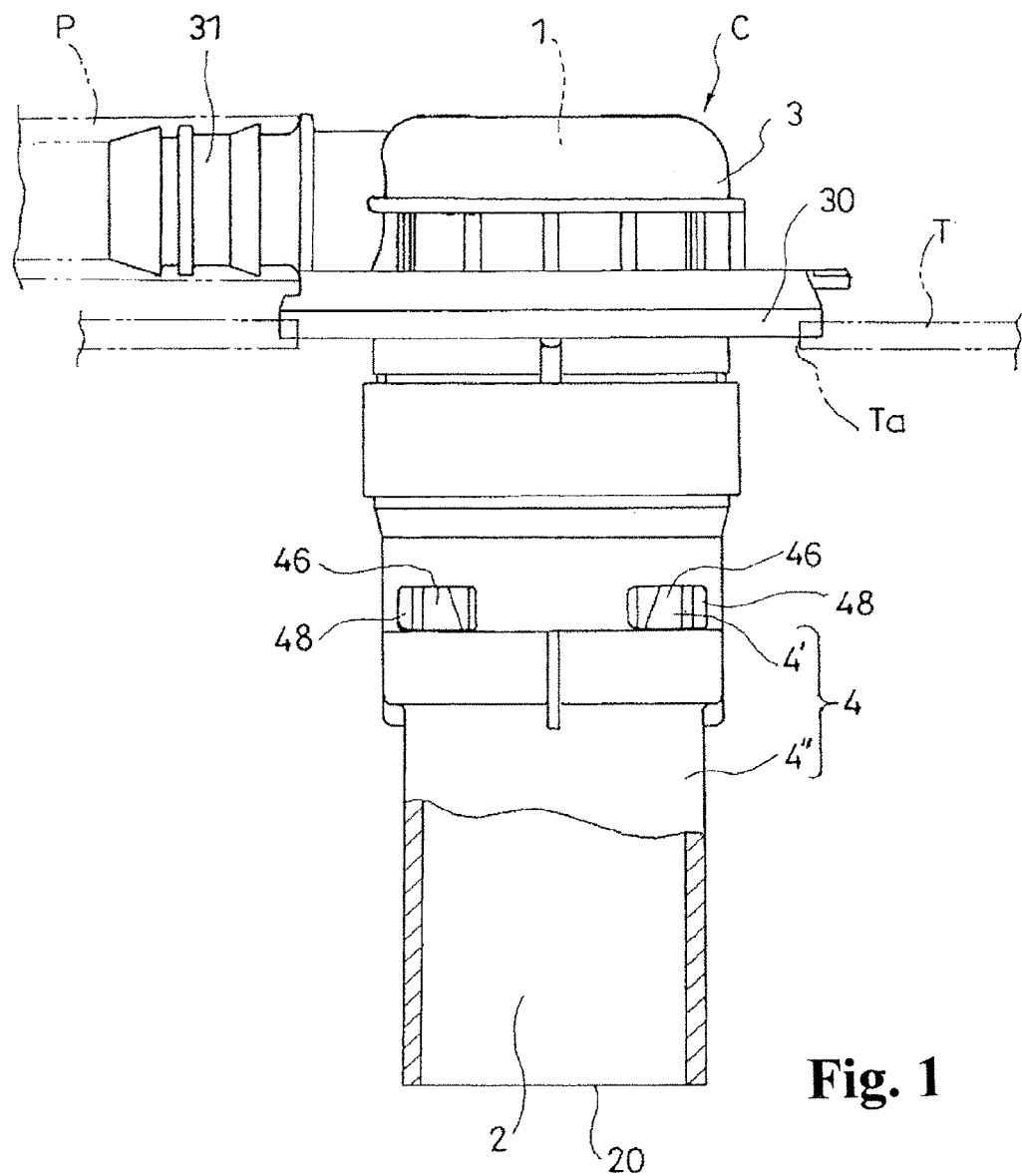
FIG. 1 is a side view showing a used state of a connector according to an embodiment of the present invention.
Figure 2:
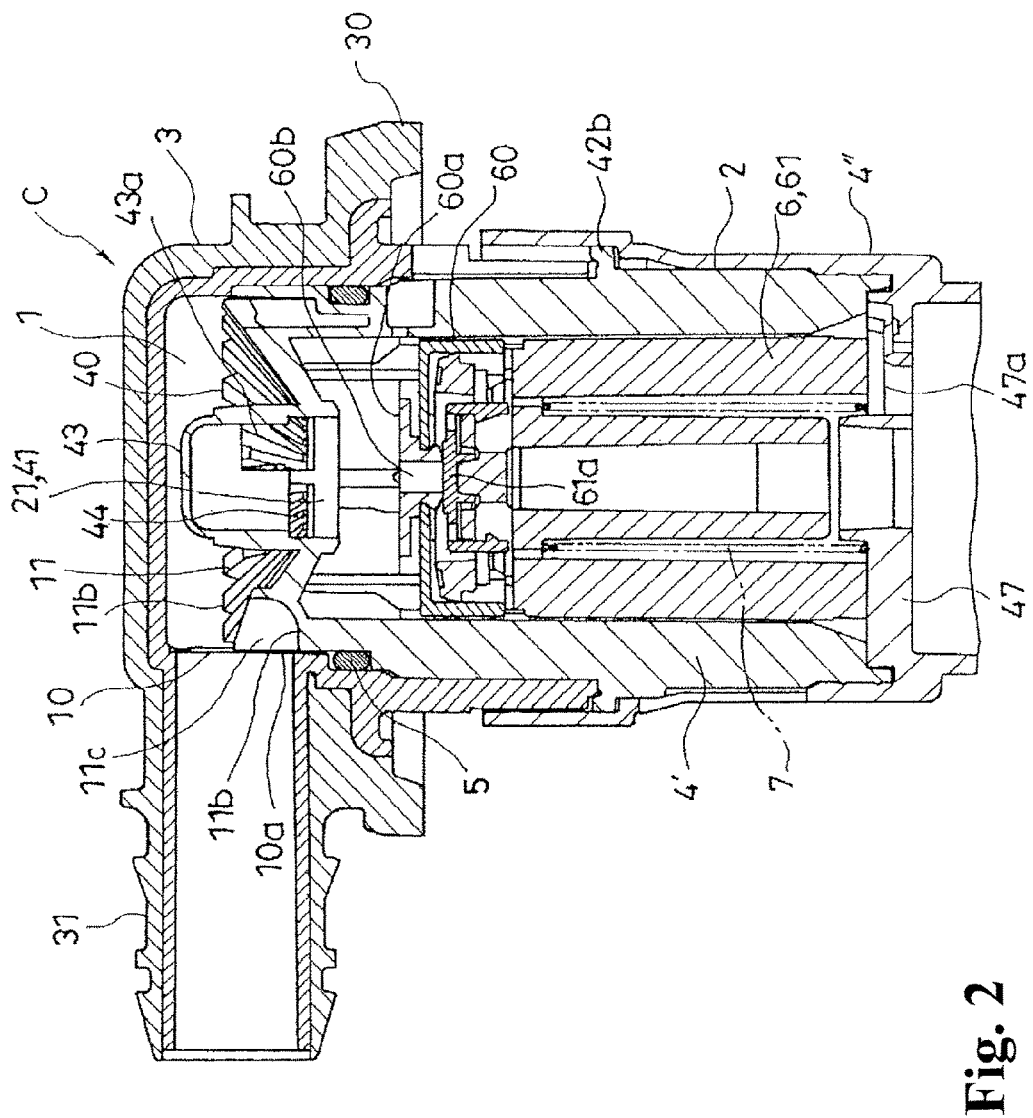
FIG. 2 is a cross-sectional view of an upper portion of the connector.
Figure 3:
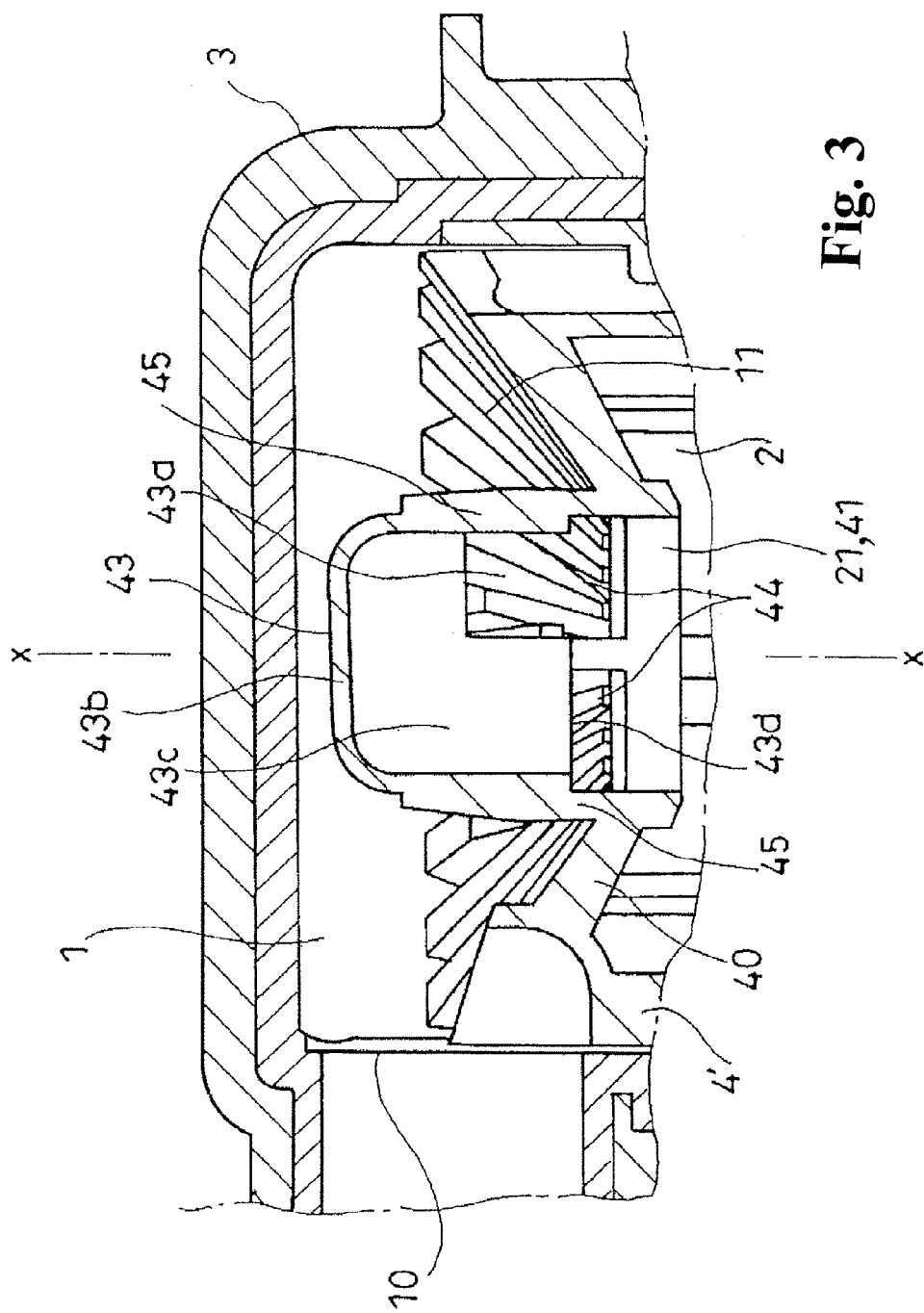
FIG. 3 is an enlarged view of essential parts in FIG. 2.
Figure 4:
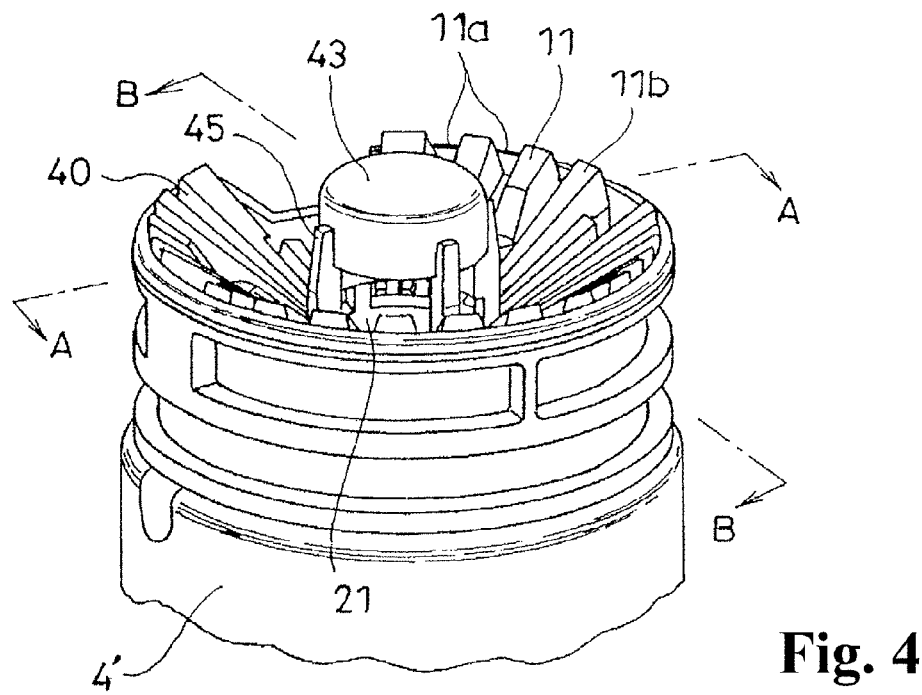
FIG. 4 is a perspective view of an upper portion of an upper case forming the connector.
Figure 5:
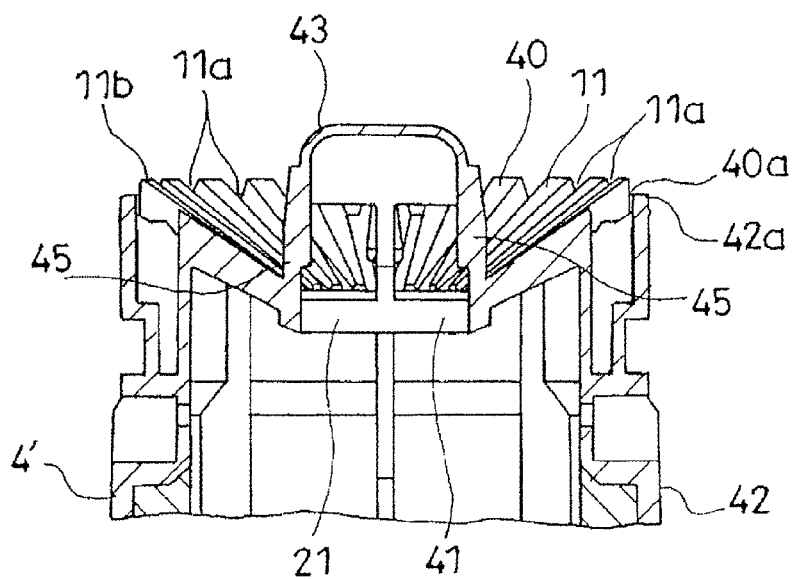
FIG. 5 is a cross-sectional view at a position taken along a line A-A in FIG. 4.
Figure 6:
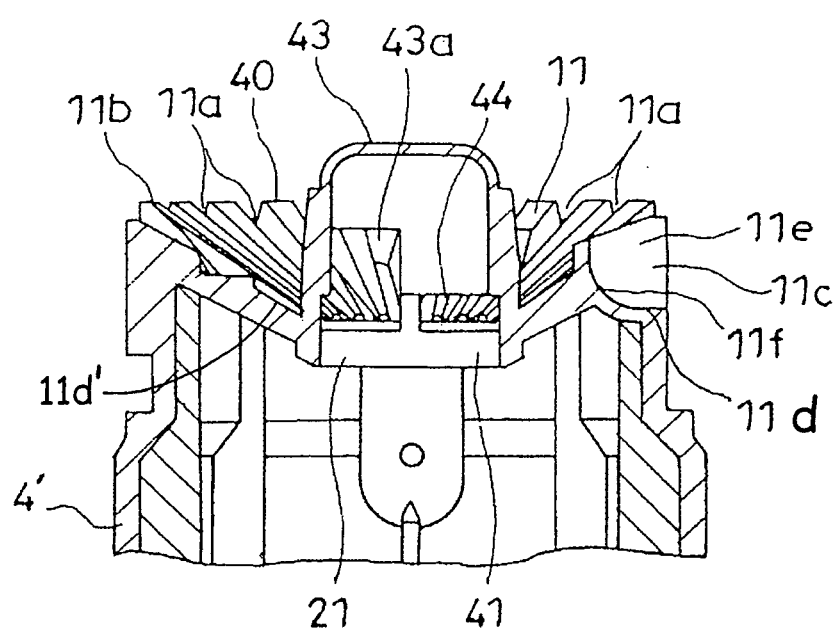
FIG. 6 is a cross-sectional view at a position taken along a line B-B in FIG. 4.

Hereinafter, based on FIG. 1 to FIG. 6, a typical embodiment of the present invention will be explained. A fuel tank connector C according to the embodiment is attached to a fuel tank T of an automobile, a two-wheel vehicle, or the like, and is used for connecting a ventilation flow path P of the fuel tank T to the fuel tank T.

Such connector C comprises an upper chamber 1 including a first communication portion 10 relative to the ventilation flow path P; and a lower chamber 2 including a second communication portion 20 relative to the fuel tank T, and a third communication portion 21 relative to the upper chamber 1.

In an illustrated example, the connector C is formed by combining a main body 3 and a case 4.

The main body 3 has a short cylindrical shape closing a cylinder upper end and opening at a cylinder lower end. In a position approximately in a middle in an up-and-down direction of the main body 3, there is formed an outer flange 30. Also, in a side portion of the main body 3 positioned between the cylinder upper end and the outer flange 30, there is provided a pipe body 31 whose one pipe end is integrally connected to the side portion, and which protrudes in a direction orthogonal to a center shaft of the main body 3 from the side portion. The pipe body 31 communicates with an inside of the main body 3 at one pipe end, and the other pipe end is open. In the illustrated example, a communication portion between the pipe body 31 and the main body 3 functions as the first communication portion 10. In the illustrated example, by connecting a tube forming the ventilation flow path P, and the like to the pipe body 31, the ventilation flow path P is connected to the fuel tank T through the connector C.

The case 4 is formed by combining an upper case 4' and a lower case 4''. Both the upper case 4' and the lower case 4'' have a cylindrical shape.

A cylinder lower end of the upper case 4' is open. the other hand, in a cylinder upper end of the upper case 4', a top portion 40 including a valve orifice 41 functioning as the third communication portion 21 is formed in the center.

The top portion 40 of the upper case 4' integrally connects an outer circumferential portion 40a thereof to an upper edge 42a of a side portion 42 of the upper case 4'; is located at the center thereof lower than the upper edge 42a of the side portion 42; and forms the later-described bowl-shaped portion 11 between the outer circumferential portion 40a and the center.

Directly above the valve orifice 41 which becomes the third communication portion 21 in the top portion 40 of the upper case 4', there is supported a cover body 43.

Such cover body 43 has a container shape including a top portion 43b and a side portion 43c and opening at a lower face. In the illustrated example, such cover body 43 has a short cylindrical shape having an outer diameter approximately equal to an orifice diameter of the circular valve orifice 41; is closed at a cylinder upper end so as to form the top portion 43b; and is opened at a cylinder lower end.

Also, such cover body 43 is supported with ventilation intervals 44 between an open edge 43d thereof and the third communication portion 21. In the illustrated example, such cover body 43 is supported directly above the valve orifice 41 by leg bodies 45 formed between the cylinder lower end of the cover body 43 and an open edge of the valve orifice 41 in such a way as to form the ventilation intervals 44 between the cylinder lower end thereof and the valve orifice 41. In the illustrated example, the leg bodies 45 are provided at four portions with an equal interval between the leg bodies 45 and 45 next to each other in a direction around a cylinder shaft of the cover body 43, and there are respectively formed the ventilation intervals 44 between the leg bodies 45 and 45 next to each other.

Also, on a side opposed to a side facing the first communication portion 10 in such cover body 43, there is formed a notch portion 43a notching a side portion of the cover body 43 from a lower side in a vertical area which becomes approximately half a top-to-bottom length of the cover body 43, and also in a horizontal area approximately corresponding to a radius of the cover body 43. By the notch portion 43a, the ventilation interval 44 is widened on the side opposed to the side facing the first communication portion 10. Namely, the ventilation interval 44 between the cover body 43 and the third communication portion 21, is an opening through the side portion 43c between legs 45 and, the ventilation interval 44 being narrowed on a formation side of the first communication portion 10, and is widened on a side opposed to the formation side of the first communication portion 10.

Also, the open edge 43d of such cover body 43 is formed in such a way as to be located in the same position as an upper end 11b of the bowl-shaped portion 11 or lower than that at any position around a cylinder shaft x (see FIG. 3) of the cover body 43.

In a position which is an outside of the side portion 42 of the upper case 4', and is approximately in a middle in an up-and-down direction thereof, there is formed a positioning portion 42b. In the illustrated example, an upper portion of the upper case 4' is fitted into the main body 3 up to a position wherein the cylinder lower end of the main body 3 hits the positioning portion 42b of the upper case 4', and both the upper case 4' and the main body 3 are engaged by an engagement device which is not shown in the figures. Accordingly, the upper case 4' and the main body 3 are combined. In that combined state, the upper chamber 1 is formed between the top portion 40 of the upper case 4' and the cylinder upper end of the main body 3. The reference number 5 in the figure represents a seal ring located between the top portion 40 of the upper case 4' and the positioning portion 42b, and sealing between an inner face of the main body 3 and an outer face of the upper case 4'.

The lower case 4" is formed to open at both the cylinder upper end and the cylinder lower end. In a position approximately in a middle in an up-and-down direction of the lower case 4", there is formed a dividing wall 47 dividing a space inside the lower case 4" in half up and down. In the dividing wall 47, there is formed a ventilation portion 47a. In the illustrated example, a lower portion of the upper case 4' is fitted into the lower case 4" up to a position wherein the cylinder lower end of the upper case 4' hits the dividing wall 47 of the lower case 4", and engagement projections, shown by the reference number 46 in FIG. 1 and formed outside the upper case 4', are inserted into and engaged with engagement windows, shown by the reference number 48 in FIG. 1, of the lower case 4". Accordingly, the lower case 4" and the upper case 4' are combined. In the illustrated example, a space inside the case 4 formed by the lower case 4" and the upper case 4' becomes the lower chamber 2, and the cylinder lower end of the lower case 4" functions as the second communication portion 20.

In the illustrated example, the case 4 is formed to have a width which can be entered into an attachment hole Ta provided in the fuel tank T in a penetration state, and an outer diameter of a formation portion of the outer flange 30 of the main body 3 is formed to have a length which cannot be entered into the attachment hole Ta. Then, in a state wherein a lower side of the outer flange 30 is inserted into the fuel tank T through such attachment hole Ta, the outer flange 30 is welded in an outer face portion of the fuel tank T, so that the connector C is attached to the fuel tank T.

Also, in the embodiment, in the lower chamber 2 of the connector C, there is housed a float body 6 functioning as a valve closing the third communication portion 21 when a fuel in a liquid state flows into the lower chamber 2. In the illustrated example, the float body 6 is housed between the top portion 40 of the upper case 4' and the dividing wall 47 of the lower case 4" in the case 4 movably up and down. In the illustrated example, the float body 6 is formed by an upper float 60 including a valve body 60a relative to the valve orifice 41; and a lower float 61 including a valve body 61a relative to a valve orifice 60b formed in the center of the upper float 60. A distance between the valve body 60a of the upper float 60 and a lower end of the lower float 61 is smaller than a distance between the top portion 40 of the upper case 4' and the dividing wall 47 of the lower case 4". Also, there is formed a gap between an outer face of the float body 6 and an inner face of the upper case 4'. Thereby, in a state wherein the float body 6 is lowered, the gas inside the fuel tank T flows into the lower chamber 2 from the second communication portion 20, and flows into the upper chamber 1 from the third communication portion 21 through the aforementioned gap. When a fuel liquid face of the fuel inside the fuel tank T rises, and the fuel flows into the case 4 through the third communication portion 21, both the lower float 61 and the upper float 60 rise, and the valve body of the upper float 60 is seated at the valve orifice 41 which becomes the third communication portion 21 so as to close the valve orifice 41. When the fuel flows out of the case 4, the lower float 61 descends and the valve body 61a of the lower float 61 separates from the valve orifice 60b of the upper float 60. Thereby, the upper chamber 1 and the lower chamber 2 are communicated in a range of the valve orifice 60b of the upper float 60, and after that, the upper float 60 drops, and the upper chamber 1 and the lower chamber 2 are communicated with the third communication portion 21. Also, in the illustrated example, a constant urging force always acts on the float body 6 by a compression coil spring 7 disposed between the lower float 61 and the dividing wall 47.

A bottom portion 11*d'* of the upper chamber 1 is formed by the top portion 40 of the upper case 4', and a bottom portion of the upper chamber 1 becomes the bowl-shaped portion 11 narrowing downward by the top portion 40 of the upper case 4'. Then, in a bottom of the bowl-shaped portion 11, there is formed the third communication portion 21. Also, on a wall face of the bowl-shaped portion 11, there are formed concave and convex portions. Namely, in the embodiment, an upper face of the top portion 40 of the upper case 4' is formed to have a bowl shape.

According to the embodiment, even in a case wherein the fuel enters into the upper chamber 1 through the third communication portion 21, while preventing the fuel entered in that manner from moving to a first communication portion 10 side by the aforementioned concave and convex portions, the fuel can be led to a lower chamber 2 side through the third communication portion 21 by inclination of the bowl-shaped portion 11, so that the fuel entered in that manner can be prevented from entering into the ventilation flow path P. Typically, at a fueling time or when a vehicle is inclined, and the like, when the fuel enters into the lower chamber 2, the fuel injected into the upper chamber 1 together with the gas flowed into the upper chamber 1 through the third communication portion 21 can be prevented from entering in the ventilation flow path P.

In the embodiment, the aforementioned concave and convex portions are formed by a plurality of grooves 11*a*, 11*a*, etc. formed in the bowl-shaped portion 11. Also, such groove 11*a* is formed between the upper end 11*b* of the bowl-shaped portion 11 and the third communication portion 21. More specifically, in the bowl-shaped portion 11, there is formed the plurality of grooves 11*a*, 11*a*, etc. with approximately an equal interval between the grooves 11*a* next to each other in a direction surrounding the third communication portion 21. Then, such groove 11*a* becomes a concave portion, and the interval between the grooves 11*a* next to each other becomes a convex portion. Thereby, in the embodiment, the fuel entered into the upper chamber 1 in the aforementioned manner can be adequately led to the lower chamber 2 through the third communication portion 21 by the grooves 11*a*. In a case wherein the vehicle has inclined as mentioned above, as long as the inclination is in a range of an assumed inclination, it is preferable that the groove 11*a* has a depth in which the fuel entering in the bowl-shaped portion 11 does not traverse the groove 11*a*. Also, it is preferable that the groove 11*a* is formed to have a shape in a cross section widening a groove width as moving from a groove bottom to a groove opening such that the fuel does not remain inside the groove by a surface tension thereof.

Also, in the embodiment, the cover body 43 is supported directly above the third communication portion 21 in the upper chamber 1 while securing the aforementioned ventilation gap, so that at first, a communication state between the upper chamber 1 and the lower chamber 2 through the third communication portion 21 never becomes impaired by the cover body 43. Secondly, a fuel in a splash form injected into the upper chamber 1 in the aforementioned manner can be returned to the lower chamber 2 through the third communication portion 21 by being blocked by the cover body 43. Thirdly, a flow path between the third communication portion 21 and the first communication portion is complicated adequately without increasing a pressure loss by the cover body 43. Thereby, a fuel in a mist form entered into the upper chamber 1 is dripped in an inner face of the cover body 43, the bowl-shaped portion 11, and an inner face of the upper chamber 1 as much as possible so as to return to the lower chamber 2 through the third communication portion 21.

Especially, in the embodiment, the open edge 43*d* of such cover body 43 is located lower than the upper end 11*b* of the bowl-shaped portion 11 at any position around the cylinder shaft x of the cover body 43, so that the fuel in a mist form entered into the upper chamber 1 can be effectively dripped inside the bowl-shaped portion 11.

Also, in the embodiment, the ventilation interval 44 between such cover body 43 and the third communication portion 21 narrows on the formation side of the first communication portion 10, and widens on the side opposed to the formation side of the first communication portion 10, so that the fuel in a mist form entered into the upper chamber 1 is guided mainly to the side opposite to the first communication portion 10 so as to be dripped.

Also, in the embodiment, the bottom portion of the upper chamber 1 is formed by the bowl-shaped portion 11, so that without leaving the fuel entered into the upper chamber 1 and dripped in the inner face of the upper chamber 1, the fuel can be collected by the bowl-shaped portion 11, and be returned to the lower chamber 2 through the third communication portion 21.

Also, in the embodiment, the first communication portion 10 is formed in a side portion of the upper chamber 1, and at least one portion thereof is located lower than the upper end 11*b* of the bowl-shaped portion 11. Specifically, the center shaft of the pipe body 31, i.e., the center of the first communication portion 10 is positioned approximately at a level of the upper end 11*b* of the bowl-shaped portion 11. Therewith, in a portion facing the first communication portion 10 in such bowl-shaped portion 11, there is formed a concave portion 11*c* concaved toward an inside of the bowl-shaped portion 11 where one portion of the bowl-shaped portion 11 is notched. Namely, such concave portion 11*c* opens respectively on the upper side and the first communication portion 10 side. Also, a bottom 11*d* of the concave portion 11*c* is positioned at the same level as a lower end of the first communication portion 10. Also, a side wall 11*e* and the bottom 11*d* of the concave portion 11*c* are connected by a round surface 11*f*. Thereby, in the embodiment, while setting the first communication portion 10 at the aforementioned level, i.e., while reducing a total height of a portion protruding to an outside of the fuel tank T in the connector C as much as possible, the gas inside the fuel tank T can smoothly move to the ventilation flow path P through the first communication portion 10.

All contents of the specification, claims, drawings, and abstract of Japanese Patent Application No. 2011-197912 filed on Sep. 12, 2011 are cited in their entireties herein and are incorporated as a disclosure of the specification of the present invention.

What is claimed is:

1. A fuel tank connector attached to a fuel tank for connecting a ventilation flow path of the fuel tank connector to the fuel tank, comprising:
    an upper chamber including a first communication portion relative to the ventilation flow path;
    a lower chamber including a second communication portion relative to the fuel tank;
    a bowl-shaped portion situated between the upper chamber and the lower chamber to separate the upper chamber and the lower chamber, the bowl-shaped portion narrowing downward to a bottom portion at a center of the bowl-shaped portion and having a third communication portion at the bottom portion, and a cover body disposed directly above the third communication portion, and having a lateral size smaller than that of the bowl-shaped portion, the cover body including leg portions attached to the bowl-shaped portion, a closed top portion covering the third communication portion, and a side portion partially closing a periphery of the third communication portion with a ventilation interval between the side portion and the third communication portion so that a fluid from the lower chamber hits the cover body and flows to the first communication portion through the ventilation interval.

2. A fuel tank connector according to claim 1, wherein the ventilation interval between the side portion of the cover body and the third communication portion narrows on a side of the first communication portion, and widens on a side away from the side of the first communication portion.

3. A fuel tank connector according to claim 2, wherein the bowl-shaped portion has a plurality of grooves radially upwardly extending from the center of the bowl-shaped portion, the center forming the third communication portion, and a width of each of the plurality of grooves widens from the center of the bowl-shaped portion to an outer end of the bowl-shaped portion.

* * * * *